US012592900B2

(12) United States Patent
Ahn et al.

(10) Patent No.: US 12,592,900 B2
(45) Date of Patent: Mar. 31, 2026

(54) METHOD AND APPARATUS FOR MESSAGING SERVICE

(71) Applicant: KAKAO CORP., Jeju-si (KR)

(72) Inventors: Seon Young Ahn, Seongnam-si (KR);
Hye Jung Roh, Seongnam-si (KR);
Hyun Ji Im, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/765,111

(22) Filed: Jul. 5, 2024

(65) Prior Publication Data

US 2025/0016123 A1      Jan. 9, 2025

(30) Foreign Application Priority Data

Jul. 6, 2023    (KR) ........................ 10-2023-0088040

(51) Int. Cl.
*H04L 51/04*       (2022.01)
*G06Q 50/00*       (2012.01)
*H04J 3/06*        (2006.01)

(52) U.S. Cl.
CPC ............. *H04L 51/04* (2013.01); *G06Q 50/01* (2013.01); *H04J 3/0638* (2013.01)

(58) Field of Classification Search
CPC ......... H04L 51/04; G06Q 50/01; H04J 3/0638
USPC ........................................................ 705/319
See application file for complete search history.

(56) References Cited

U.S. PATENT DOCUMENTS 6,393,412 B1 *   5/2002  Deep .................. G06Q 30/0284
                                                     705/418

| | | | | |
|---|---|---|---|---|
| 7,272,633 | B2 * | 9/2007 | Malik | H04M 3/436 |
| | | | | 709/205 |
| 7,441,027 | B2 * | 10/2008 | Malik | H04M 3/2218 |
| | | | | 709/224 |
| 8,301,169 | B2 * | 10/2012 | Hung | H04L 51/043 |
| | | | | 455/518 |
| 8,914,444 | B2 * | 12/2014 | Hladik, Jr. | H04L 51/04 |
| | | | | 709/206 |
| 8,997,007 | B1 * | 3/2015 | Bennett | H04N 21/41407 |
| | | | | 715/753 |
| 9,495,421 | B1 * | 11/2016 | DeHaan | G06F 16/219 |
| 10,216,709 | B2 * | 2/2019 | Lane | H04W 4/18 |

(Continued)

FOREIGN PATENT DOCUMENTS

| | | | |
|---|---|---|---|
| KR | 20130012183 A | 2/2013 |
| KR | 20160042491 A | 4/2016 |
| KR | 20170004324 A | 1/2017 |

OTHER PUBLICATIONS

Office Action, dated Aug. 11, 2025, for Korean Patent Application No. 10-2023-0088040. (12 pages).

*Primary Examiner* — Michael Tomaszewski
(74) *Attorney, Agent, or Firm* — Seed Intellectual Property Law Group LLP

(57)        ABSTRACT

A messaging service method and apparatus are disclosed. A method of operating a terminal executing an instant messenger according to an embodiment is disclosed. The method may include obtaining information about a time zone of a sending target of a scheduled message. The method may include setting a sending time of the scheduled message based on the information about the time zone of the sending target. The method may include requesting registration of a record about the scheduled message in response to a user account.

20 Claims, 9 Drawing Sheets

(56) References Cited

U.S. PATENT DOCUMENTS

| | | | | | | |
|---|---|---|---|---|---|---|
| 2001/0051989 A1* | 12/2001 | Moncreiff | H04N 21/4788 709/227 | | | |
| 2006/0114920 A1* | 6/2006 | Jung | H04L 67/14 370/410 | | | |
| 2007/0160024 A1* | 7/2007 | Jung | H04L 67/75 370/338 | | | |
| 2007/0186172 A1* | 8/2007 | Sego | H04L 12/1831 709/204 | | | |
| 2008/0028032 A1* | 1/2008 | Hladik | H04L 51/04 709/207 | | | |
| 2009/0215476 A1* | 8/2009 | Tysowski | H04L 51/04 455/466 | | | |
| 2010/0153506 A1* | 6/2010 | Lim | H04L 51/04 709/206 | | | |
| 2010/0205541 A1* | 8/2010 | Rapaport | G06Q 30/02 715/753 | | | |
| 2011/0081920 A1* | 4/2011 | Hung | H04L 51/043 455/456.3 | | | |
| 2011/0298618 A1* | 12/2011 | Stahl | H04L 67/025 340/573.1 | | | |
| 2012/0197969 A1* | 8/2012 | Poon | H04L 12/6418 709/203 | | | |
| 2013/0036184 A1* | 2/2013 | Hung | G06Q 10/109 709/206 | | | |
| 2013/0046828 A1* | 2/2013 | Grewal | G06Q 10/10 709/204 | | | |
| 2014/0280659 A1* | 9/2014 | Siram | H04L 12/1895 709/207 | | | |
| 2015/0082212 A1* | 3/2015 | Sharda | H04L 67/55 715/764 | | | |
| 2015/0264531 A1* | 9/2015 | Kim | H04W 4/12 455/414.3 | | | |
| 2015/0319203 A1* | 11/2015 | Jeremias | G06F 3/0484 715/753 | | | |
| 2016/0103424 A1* | 4/2016 | Shin | G06Q 10/109 368/29 | | | |
| 2016/0119274 A1* | 4/2016 | Ghafourifar | H04L 51/066 709/206 | | | |
| 2016/0255494 A1* | 9/2016 | Shin | H04W 8/183 455/415 | | | |
| 2016/0352674 A1* | 12/2016 | Strom | G06F 40/58 | | | |
| 2017/0289074 A1* | 10/2017 | Joo | H04L 67/52 | | | |
| 2017/0366480 A1* | 12/2017 | Sagar | H04L 51/04 | | | |
| 2018/0309801 A1* | 10/2018 | Rathod | H04M 3/5175 | | | |
| 2021/0194843 A1* | 6/2021 | Vendrow | H04L 51/226 | | | |
| 2021/0211399 A1* | 7/2021 | Kim | H04L 51/216 | | | |
| 2021/0400142 A1* | 12/2021 | Jorasch | H04L 65/1069 | | | |
| 2022/0272066 A1* | 8/2022 | Choi | H04L 51/224 | | | |
| 2022/0311727 A1* | 9/2022 | Agarwal | H04L 51/046 | | | |
| 2022/0350476 A1* | 11/2022 | Tsai | G06F 3/0488 | | | |
| 2023/0370405 A1* | 11/2023 | Kim | H04L 51/226 | | | |
| 2024/0242625 A1* | 7/2024 | Reyna | G09B 19/06 | | | |
| 2024/0396854 A1* | 11/2024 | Yoon | H04L 51/216 | | | |
| 2024/0397160 A1* | 11/2024 | Yun | H04N 21/4788 | | | |
| 2025/0016123 A1* | 1/2025 | Ahn | H04J 3/0638 | | | |

* cited by examiner

301

310

320

402

Start

Obtain information about time zone of location of participant in chat room corresponding to sending target of scheduled message ~510

Set sending time of scheduled message based on time zone of participant in chat room ~520

Register record about scheduled message in response to user account ~530

End

METHOD AND APPARATUS FOR MESSAGING SERVICE

CROSS-REFERENCE TO RELATED APPLICATIONS

This application claims priority under 35 USC § 119 (a) to Korean Patent Application No. 10-2023-0088040 filed on Jul. 6, 2023, in the Korean Intellectual Property Office, the disclosure of which is incorporated by reference herein in its entirety.

BACKGROUND

Technical Field

The following description relates to a messaging service method and apparatus.

Description of the Related Art

A recent advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

As communication through the mobile devices grows, the online platform services may support one-to-one text-type communication with other users and may also support a function for sharing various types of data and assisting in communication.

BRIEF SUMMARY

Various embodiments of the present disclosure provide a technology for an interface of a chat room for displaying information about a time zone in which a participant in the chat room is located.

Various embodiments of the present disclosure provide a scheduled message function for setting a sending time based on a time zone of a receiver of a message when setting a scheduled message to send a pre-written message to a predetermined target at a preset time.

However, various embodiments are not limited to the preceding aspect, and there may be other technical aspects.

According to some embodiments, there is provided a method of operating a terminal executing an instant messenger, the method including: obtaining information about a time zone of a sending target of a scheduled message; setting a sending time of the scheduled message based on the information about the time zone of the sending target; and requesting registration of a record about the scheduled message in response to a user account.

The setting of the sending time of the scheduled message may include: providing a time zone list comprising entries corresponding to regions in which each participant in the chat room corresponding to the sending target is located; and setting the sending time of the scheduled message based on a time zone of a region corresponding to an entry selected from the time zone list.

The time zone list may include entries corresponding to regions arranged based on the number of participants located in a region corresponding to each of the entries.

The sending target of the scheduled message may include at least one of another user account subscribed to an instant messaging service (IMS); and a chat room created in the IMS.

The record about the scheduled message may include information about content of the scheduled message, information about the sending target of the scheduled message, and information about the sending time of the scheduled message.

The scheduled message may be sent to the chat room corresponding to the sending target at the sending time of the scheduled message, based on whether the chat room corresponding to the sending target of the scheduled message is valid.

According to some embodiments, there is provided a method of operating a terminal executing an instant messenger, the method including: identifying, among participants in a chat room accessed by a user account, a participant located in a time zone different from that of the user account; adding, to an interface of the chat room, an indicator indicating the presence of the participant located in the time zone different from that of the user account; and displaying information about the time zone in which the participant in the chat room is located, based on the indicator.

The displaying of the information about the time zone in which the participant in the chat room is located may include displaying current time information corresponding to a location of the participant in the chat room.

The displaying of the information about the time zone in which the participant in the chat room is located may include displaying information about a region corresponding to the time zone in which the participant in the chat room is located.

The information about the region may include at least one of an identification value of the region and weather information of the region.

The displaying of the information about the time zone in which the participant in the chat room is located may include displaying information about participants in the chat room located in respective time zones.

The adding of the indicator may include updating the indicator, based on at least one of a change in the time zone of the user account and a change in the time zone of the participant in the chat room.

According to some embodiments, there is provided a terminal executing an instant messenger, the terminal including a processor configured to: obtain information about a time zone of a sending target of a scheduled message; set a sending time of the scheduled message based on the information about the time zone of the sending target; and request registration of a record about the scheduled message in response to a user account.

For setting the sending time of the scheduled message, the processor may be configured to: provide a time zone list comprising entries corresponding to regions in which each participant in the chat room corresponding to the sending target is located; and set the sending time of the scheduled message based on a time zone of a region corresponding to an entry selected from the time zone list.

The time zone list may include entries corresponding to regions arranged based on the number of participants located in a region corresponding to each of the entries.

According to some embodiments, there is provided a terminal executing an instant messenger, the terminal including a processor configured to: identify, among participants in a chat room accessed by a user account, a participant located in a time zone different from that of the user account; add, to an interface of the chat room, an indicator indicating the presence of the participant located in the time zone different from that of the user account; and display information about the time zone in which the participant in the chat room is located, based on the indicator.

For displaying the information about the time zone in which the participant in the chat room is located, the processor may be configured to display current time information corresponding to a location of the participant in the chat room.

For displaying the information about the time zone in which the participant in the chat room is located, the processor may be configured to display information about a region corresponding to the time zone in which the participant in the chat room is located.

For displaying the information about the time zone in which the participant in the chat room is located, the processor may be configured to: display information about participants in the chat room located in respective time zones.

For adding the indicator, the processor may be configured to: update the indicator based on at least one of a change in the time zone of the user account and a change in the time zone of the participant in the chat room.

BRIEF DESCRIPTION OF THE SEVERAL VIEWS OF THE DRAWINGS

The above and other features of certain embodiments of the present disclosure will be more apparent from the following detailed description, taken in conjunction with the accompanying drawings, in which.

DETAILED DESCRIPTION

Figure 1:
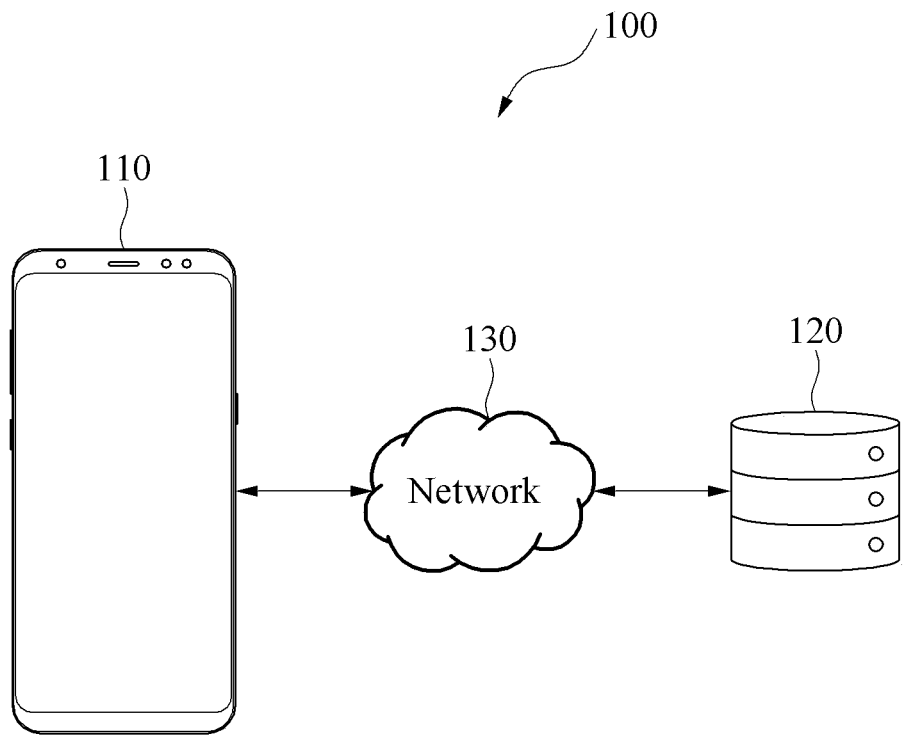
FIG. 1 is a diagram illustrating a system for an instant messaging service (IMS) according to an embodiment.

The following detailed structural or functional description is provided only for the purpose of providing examples, and various alterations and modifications may be made to the examples. Here, the examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that, if one component is described as "connected," "coupled," or "joined" to another component, a third component may be "connected," "coupled," and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

The text "at least one of A and B" as used herein should be understood to mean "only A, only B, or both A and B."

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the disclosure of the present application and is not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a diagram illustrating a system for an instant messaging service (IMS) according to an embodiment.

Referring to FIG. 1, according to an embodiment, a system 100 for an IMS may include a terminal 110, a server 120, and a network 130. A hardware configuration of each of the server 120 and the terminal 110 will be described in detail below.

According to an embodiment, the server 120 may include a server configured to provide an IMS through the network 130. An IMS may include a service for sending instant messages, such as, text messages, voice messages, media files, and the like, in real time over the network 130 such as a wireless Internet or wireless communication network to allow a plurality of users to conduct a real-time chat, and a service related thereto.

The server 120 may be linked with an application (hereinafter also referred to as an "app") or a web related to an IMS executed on the terminal 110 for a user interface (UI), function, operation, or service. Hereinafter, the app or web related to the IMS will be referred to as an instant messenger.

The terminal 110 may be any electronic device capable of installing and executing an app or executing a web, such as, for example, a computer, a portable computer, a wireless phone, a mobile phone, a smartphone, a personal digital assistant (PDA), a web tablet, a wearable device, and the like. In this case, the terminal 110 may receive a service and/or content through the app or the web. For example, the terminal 110 may perform overall operations related to the service, such as, for example, configuring a service screen, entering data, transmitting and receiving data, and storing data, under the control of the app or the web. For example, the terminal 110 may process a UI or a user interaction through a processor, and output or transmit a result of the processing through an output device of the terminal 110.

The terminal 110 may be driven by the instant messenger provided by the server 120. A user may execute the instant messenger on the terminal 110 to use the IMS provided by the server 120. The user may create a user account by subscribing to the IMS through the instant messenger. The user may use the IMS through the terminal 110 of the user account subscribed to the IMS. The terminal 110 of the user account subscribed to the IMS may refer to a terminal logged in with the user account subscribed to the IMS.

According to an embodiment, a chat interface may be provided on the terminal 110 through the instant messenger. The chat interface may refer to an interface for sending and receiving messages on the IMS and may include, for example, an interface that provides a function for sending messages through a chat room in which at least one user account participates and displaying received messages. The chat interface may correspond to a chat room, which is a virtual space in which at least one user account participates and participants chat with each other.

Figure 2:
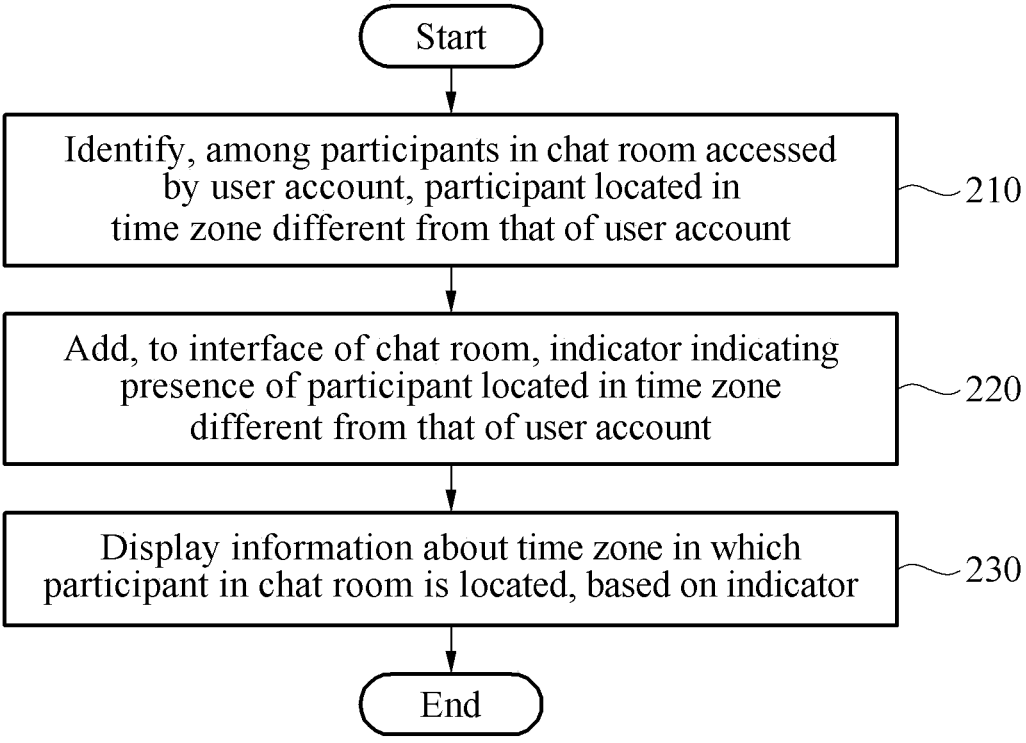
FIG. 2 is a flowchart illustrating a method of operating a terminal executing an instant messenger according to an embodiment.

FIG. 2 is a flowchart illustrating a method of operating a terminal executing an instant messenger according to an embodiment.

According to an embodiment, a terminal executing an instant messenger may be a terminal of a user account logged into with the user account, may correspond to the terminal 110 of FIG. 1.

Referring to FIG. 2, according to an embodiment, a method of operating the terminal may include operation 210 of identifying a participant located in a time zone different from that of the user account among participants in a chat room accessed by the user account. The participants in the chat room may be other user accounts participating in the chat room and may include one or more other user accounts.

For example, the time zone of the user account may be determined from a location of the terminal of the user account. The location of the terminal, which is a geographic location where the terminal is located, may be determined through various methods for positioning the location of the terminal. For example, the location of the terminal may be determined based on at least one of global positioning system (GPS) information of the terminal, information about a network (e.g., a base station and a Wi-Fi access point (AP)) to which the terminal is connected, and information about a country of the number used by the terminal. Once the location of the terminal of the user account is determined or specified, the time zone of the user account may be determined to be a time zone to which the location belongs. For example, the time zone of the user account may be determined to be a time zone set by a user or a predetermined time zone, regardless of the location of the terminal.

According to an embodiment, a server (e.g., the server 120 of FIG. 1) may obtain location information of a terminal using an IMS. The location information of the terminal using the IMS may be transmitted to the server at regular intervals or be transmitted to the server when the terminal connects to the IMS and performs a predetermined action. For example, in a case where the terminal is set not to transmit the location information to the server, the location information of the terminal may not be transmitted to the server.

According to an embodiment, information about the time zone of the user account may be shared with other user accounts. For example, the information about the time zone of the user account may be shared with other user accounts through the server. The information about the time zone may be obtained from the time zone, and may include, for example, at least one of an identification value of the time zone, current time information of the time zone, and information about a region corresponding to the time zone. For example, the information about the region may include at least one of an identification value of the region (e.g., a region name) and weather information of the region.

For example, the information about the time zone of the user account may be shared with participants in a chat room in which the user account participates. The information about the time zone of the user account may be shared with other user accounts which are friends of the user account. For example, the information about the time zone of the user account may be shared with other user accounts set by the user account as targets sharing with the time zone sharing. For example, in a case where the user account sets not to share the information about the time zone with other user accounts, the information about the time zone with of the user account may not be shared with other user accounts.

According to an embodiment, the terminal of the user account may obtain, through the server, information about time zones of participants in the chat room accessed by the user account. Based on the information about the time zones of the participants in the chat room, the terminal may identify a participant located in a time zone different from the time zone of the user account.

According to an embodiment, the method of operating the terminal may include operation 220 of adding an indicator to an interface of the chat room indicating the presence of the participant located in the time zone different from that of the user account.

Figure 3:
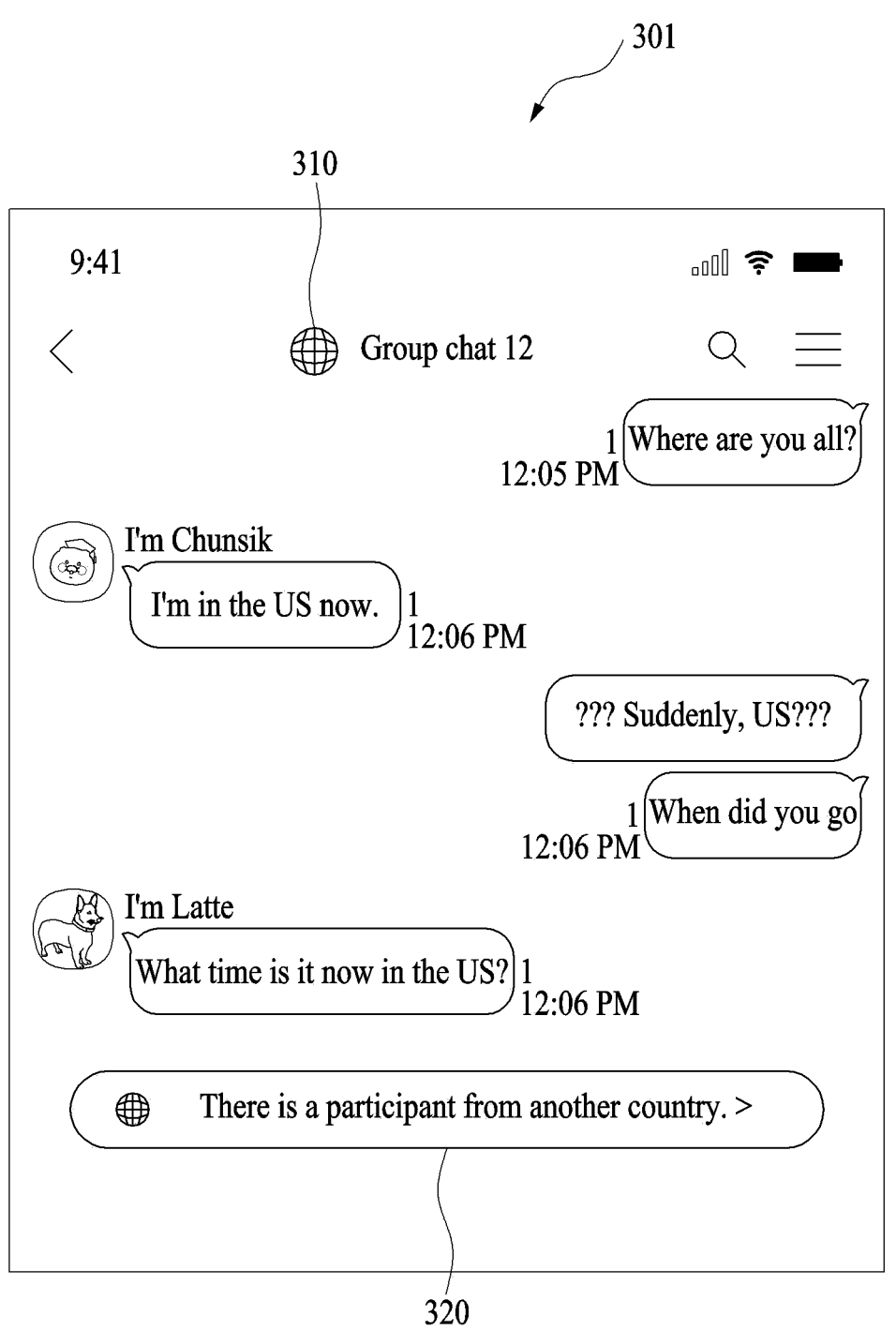
FIG. 3 is a diagram illustrating an example interface screen of a chat room indicating the presence of a participant located in a time zone different from that of a user account according to an embodiment.

For example, referring to screen 301 of FIG. 3, a first indicator 310 may be added to an interface of a chat room to indicate the presence of a participant located in a time zone different from that of a user account. For example, a second indicator 320 may be added to the interface of the chat room to indicate the presence of the participant located in the time zone different from that of the user account. For example, in the presence of the participant located in the time zone different from that of the user account, only one of the first indicator 310 and the second indicator 320 may be displayed on the interface of the chat room, or both the first indicator 310 and the second indicator 320 may be displayed.

For example, the second indicator 320 may be displayed at a time when the user account has entered the chat room. A message displayed above the second indicator 320 may correspond to a message sent through the chat room before the time at which the user account entered the chat room. A message sent through the chat room after the time at which the user account entered the chat room may be displayed below the second indicator 320.

According to an embodiment, operation 220 of adding the indicator may include updating the indicator based on a change in at least one of the time zone of the user account and the time zone of the participant in the chat room.

For example, referring to the screen 301 of FIG. 3, when at least one of the time zone of the user account and the time zone of the participant changes, the display of the first indicator 310 may change based on the changed time zone. For example, the display of the first indicator 310 may change such that the shape of the first indicator 310 changes, the color of the first indicator 310 changes, or an animation effect (e.g., blinking) is added.

For example, in a case where the participant located in the time zone different from that of the user account is not present by the change in the time zone, the display of the first indicator 310 may be removed. For example, when a current state of the participant located in the time zone different from that of the user account has changed, the display of the first indicator 310 may change. In this case, the change in the current state of the participant located in the time zone different from that of the user account may include a change in the number of participants located in the time zone different from that of the user account, a new participant being identified as the participant located in the time zone different from that of the user account, or a change in the time zone of the participant located in the time zone different from that of the user account from a first time zone to a second time zone.

According to an embodiment, the method of operating the terminal may include operation 230 of displaying information about the time zone in which the participant in the chat room is located, based on the indicator.

According to an embodiment, operation 230 of displaying the information about the time zone in which the participant in the chat room is located may include displaying current time information corresponding to a location of the participant in the chat room.

According to an embodiment, operation 230 of displaying the information about the time zone in which the participant in the chat room is located may include displaying information about a region corresponding to the time zone in which the participant in the chat room is located. The information about the region may include at least one of an identification value of the region and weather information of the region.

For example, the information about the time zone in which the participant in the chat room is located may be displayed in response to an input selecting the indicator. For example, an input selecting the second indicator 320 of FIG. 3 may change the screen to screen 401 of FIG. 4A.

Figure 4A:
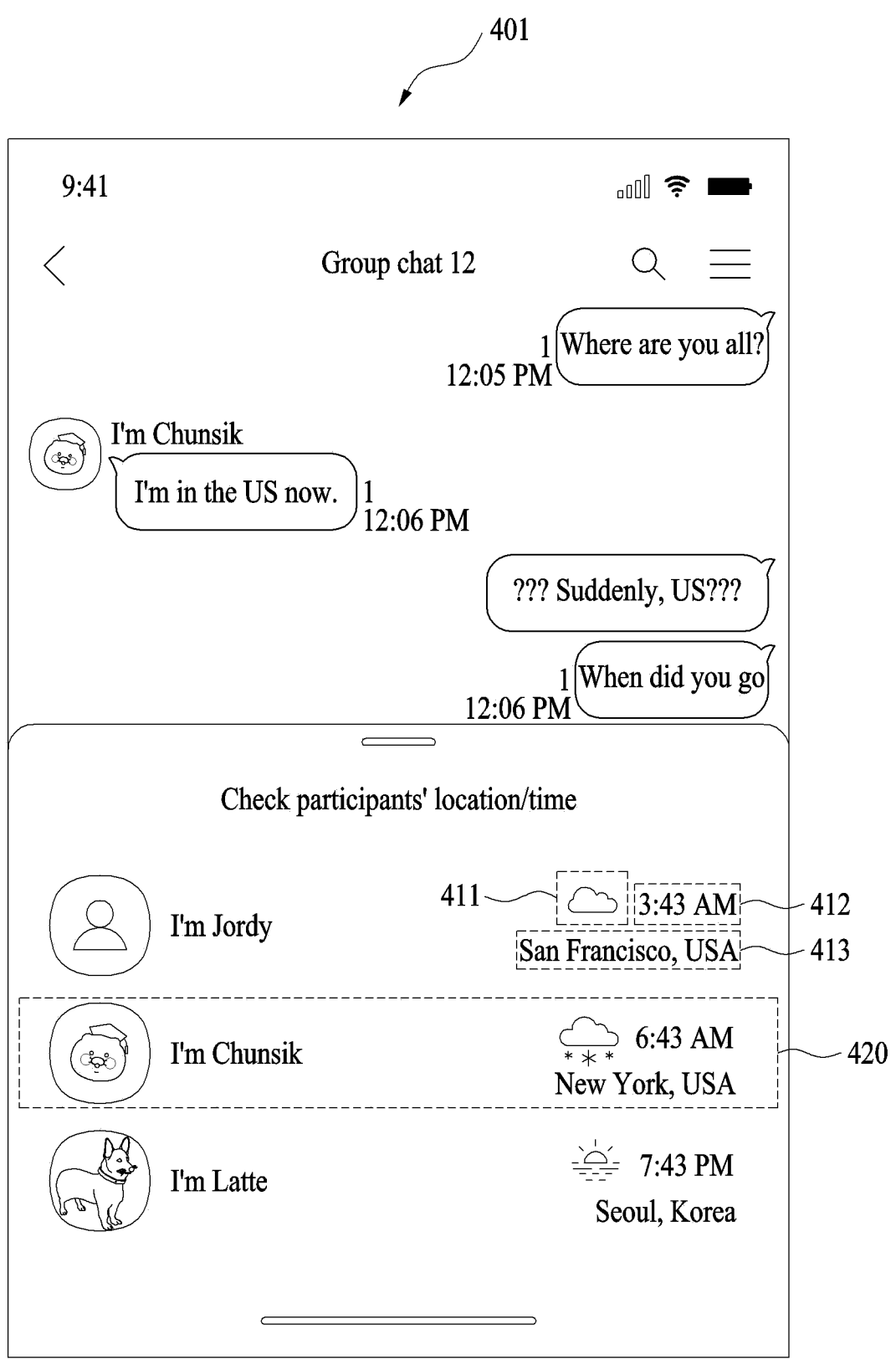
FIGS. 4A and 4B are diagrams illustrating an example interface screen of a chat room displaying information about a time zone in which a participant in the chat room is located according to an embodiment.

According to an embodiment, information about a time zone may be displayed for each participant in a chat room. For example, referring to FIG. 4A, information about a time zone in which each participant in the chat room is located may be displayed. The information about a time zone, also time zone information herein, may include at least one of current time information 412, a region's identification value 413, and region's weather information 411. Although FIG. 4A shows all the current time information 412, the region's identification value 413, and the region's weather information 411 corresponding to each participant in the chat room, only at least one of the current time information 412, the region's identification value 413, and the region's weather information 411 may be displayed.

According to an embodiment, operation 230 of displaying the information about the time zone in which the participant in the chat room is located may include displaying information about a participant located in each time zone.

For example, the interface of the chat room may display a participant list by time zone. For example, in a case where a first participant and a second participant are located in the same time zone, a participant list including the first participant and the second participant may be provided in response to information about the time zone. For example, when, even though a time zone in which the first participant is located and a time zone in which the second participant is located are the same, an identification value of a region in which the first participant is located and an identification value of a region in which the second participant is located are different from each other, the first participant may be included in a participant list corresponding to information about a first time zone, and the second participant may be included in a participant list corresponding to information about a second time zone.

Figure 4B:
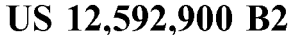

According to an embodiment, information about a time zone corresponding to a participant selected from among participants located in time zones different from that of the user account may be displayed on the terminal of the user account. In this case, the participant may be selected by an input selecting a profile of a specific participant from the interface of the chat room or an input selecting an entry corresponding to the participant from a list of information about a time zone of each participant, as shown in FIG. 4A. For example, when an input selecting an entry 420 corresponding to a specific participant is received as shown in FIG. 4A, weather information included in information about a time zone of the participant corresponding to the selected entry 420 may be displayed as a background for the chat room, as shown in screen 402 of FIG. 4B. In addition to the example shown in FIG. 4B, when a specific participant is selected, information (e.g., current time information, an identification value of a region, or weather information of the region) about a time zone of the selected participant may be displayed through the interface of the chat room provided to the terminal of the user account.

Figure 5:
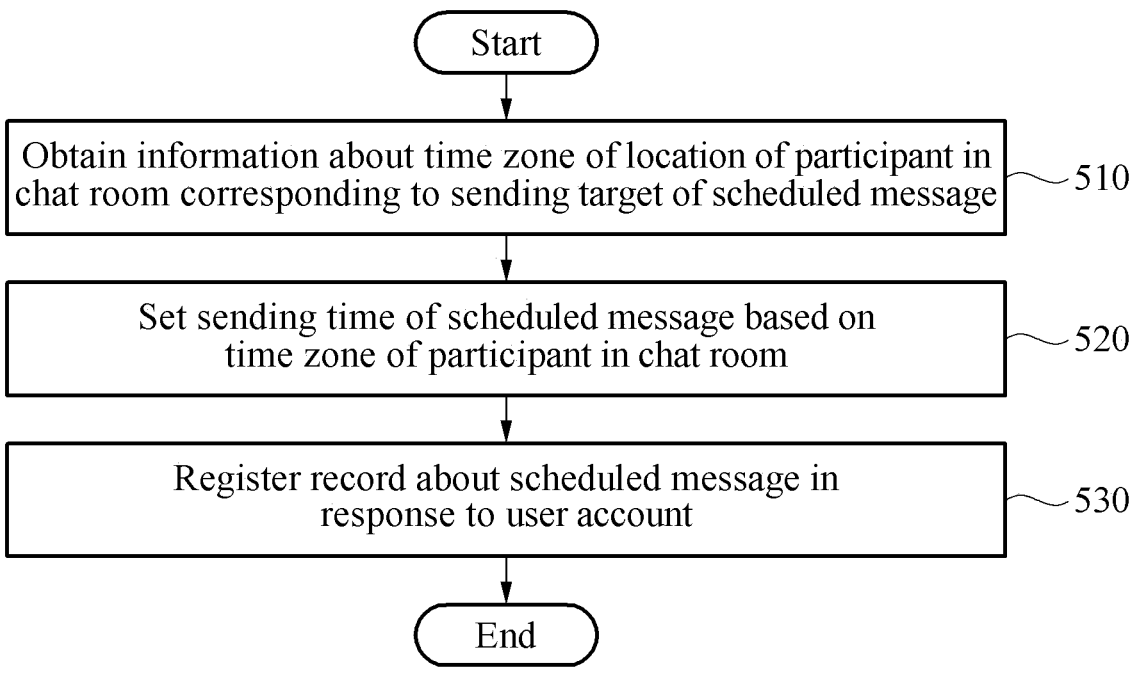
FIG. 5 is a flowchart illustrating a method of operating a terminal executing an instant messenger according to an embodiment.

FIG. 5 is a flowchart illustrating a method of operating a terminal executing an instant messenger according to an embodiment.

According to an embodiment, a terminal executing an instant messenger may be a terminal of a user account logged into with the user account, and may correspond to the terminal 110 of FIG. 1.

Referring to FIG. 5, according to an embodiment, a method of operating the terminal may include operation 510 of obtaining information about a time zone in which a participant in a chat room corresponding to a sending target of a scheduled message is located. The sending target of a scheduled message described herein may refer to a target to which the scheduled message is to be sent.

According to an embodiment, an IMS provided by a server (e.g., the server 120 of FIG. 1) may include a scheduled message function. The scheduled message function may refer to a function for sending a pre-written message to a predetermined target at a preset time. For example, the scheduled message function may further include a scheduled message management function for registering, viewing, and editing a scheduled message in response to the user accounts, in addition to a scheduled message sending function.

According to an embodiment, a scheduled message may correspond to a message to be sent to the chat room corresponding to the sending target at a sending time of the scheduled message, based on whether the chat room corresponding to the sending target is valid. The sending time of a scheduled message described herein may refer to a time at which the scheduled message is to be sent.

For example, the terminal logged in with the user account may generate a record about the scheduled message by executing the scheduled message function provided through the instant messenger. The record about the scheduled message may include information about the scheduled message, such as, information about content of the scheduled message, information about the sending time of the scheduled message, information about the sending target of the scheduled message, and/or information of a reminder for the scheduled message. The generated record may be registered or stored in connection with the user account. For example, the terminal of the user account may request the server to generate the record about the scheduled message, and may register the record about the scheduled message generated by the server in connection with the user account.

According to an embodiment, the content of the scheduled message may include content to be sent as the scheduled message. For example, the content to be sent as the scheduled message may include various types of content, such as, for example, text, emoticons, videos, and/or images.

According to an embodiment, the sending target of the scheduled message may include another user account subscribed to the IMS. For example, the other user account set as the sending target of the scheduled message may correspond to another user account that is registered as a friend of the user account. Any user of the IMS may, through an app, register identification information about another user account subscribed to the IMS, such as a phone number or ID, as a user account that is a friend of the user. Through the app, the user may set, as the sending target of the scheduled message, any one of user accounts registered as friends.

According to an embodiment, in a case where the sending target of the scheduled message is determined to be another user account, the chat room corresponding to the sending target of the scheduled message may be a chat room in which the other user account and the user account participate. For example, the chat room in which the other user account and the user account participate may correspond to a one-to-one (1:1) chat room. In this case, the participant in the chat room corresponding to the sending target of the scheduled message may include the other user account determined to be the sending target of the message. The terminal of the user account may obtain information about a time zone in which the other user account determined as the sending target is located. For example, the information about the time zone in which the other user account is located may be a time zone in which a terminal of the other user account is located, a time zone set by the user regardless of the location of the terminal of the other user account, or a predetermined time zone. For example, in a case where the other user account sets not to share the information about the time zone, the information about the time zone of the other user account may not be obtained, or the information about the time zone of the other user account may be obtained as a predetermined value. According to an embodiment, the information about the time zone in which the other user account is located may be obtained through the server.

According to an embodiment, the sending target of the scheduled message may include a chat room created in the IMS. For example, the chat room specified or set as the sending target of the scheduled message may correspond to a chat room in which the user account participates. A chat room described herein may refer to a virtual chat space provided by the IMS in which at least one user account may participate. Any user of the IMS may access the app and participate in (or join) the chat room with their user account, and the chat room in which the user account participates may be stored in connection with the user account. For example, identification information of the chat room in which the user account participates may be mapped to identification information of the user account and stored in a messaging server or in a database (DB) accessible by the server. For example, the identification information of the chat rooms in which the user account participates may also be mapped to the identification information of the user account and stored in the terminal. Through the app, the user may set any one chat room in which the user participates as the sending target of the scheduled message.

According to an embodiment, when the sending target of the scheduled message is determined to be a chat room, the terminal of the user account may obtain information about a time zone of a participant in the chat room determined as the sending target of the scheduled message. For example, when there are a plurality of participants in the chat room determined as the sending target of the scheduled message, information about a time zone of each of the participants may be obtained.

According to an embodiment, the method of operating the terminal may include operation 520 of setting a sending time of the scheduled message based on a time zone of the participant in the chat room.

According to an embodiment, the sending time of the scheduled message may include a date and time value indicating a time at which the scheduled message is to be sent. The sending time of the scheduled message may be based on the time zone in which the participant in the chat room is located. For example, in a case where the terminal of the user account located in a first time zone desires to send a scheduled message through a chat room including another user account located in a second time zone, the sending time of the scheduled message may be set based on the second time zone. Setting the sending time of the scheduled message based on a specific time zone may indicate setting the sending time of the scheduled message such that the scheduled message is to be sent at z (hour): u (minute), on x (month) y (date), based on the specific time zone.

For example, referring to screen 601 shown in FIG. 6A, in a case where the scheduled message function is invoked through an interface of a chat room, a portion of an area in the interface of the chat room may display an interface for setting a scheduled message (hereinafter, a scheduled message setting interface). The scheduled message setting interface is not limited to the screen 601 shown in FIG. 6A. For example, the scheduled message setting interface may be displayed by overlapping a chat interface corresponding to the chat room, and may be displayed through a portion of an area within the chat interface (e.g., the top of a virtual keyboard, the bottom of the virtual keyboard, or an area where the virtual keyboard is displayed).

The scheduled message setting interface may provide a function for inputting (or setting) information about a scheduled message to generate (or register) a new scheduled message. For example, the user may input, through the scheduled message setting interface, information about the new scheduled message (e.g., content of the scheduled message, a sending time of the scheduled message, a sending target of the scheduled message, and/or whether to set a reminder for the scheduled message).

According to an embodiment, when setting the scheduled message, the user may input the sending time of the scheduled message through the scheduled message setting interface. In this case, in response to an input selecting a time zone entry 611 of the sending time, an interface for selecting a reference time zone for the sending time may be provided, as shown in the screen 602 in FIG. 6B.

Figure 6A:
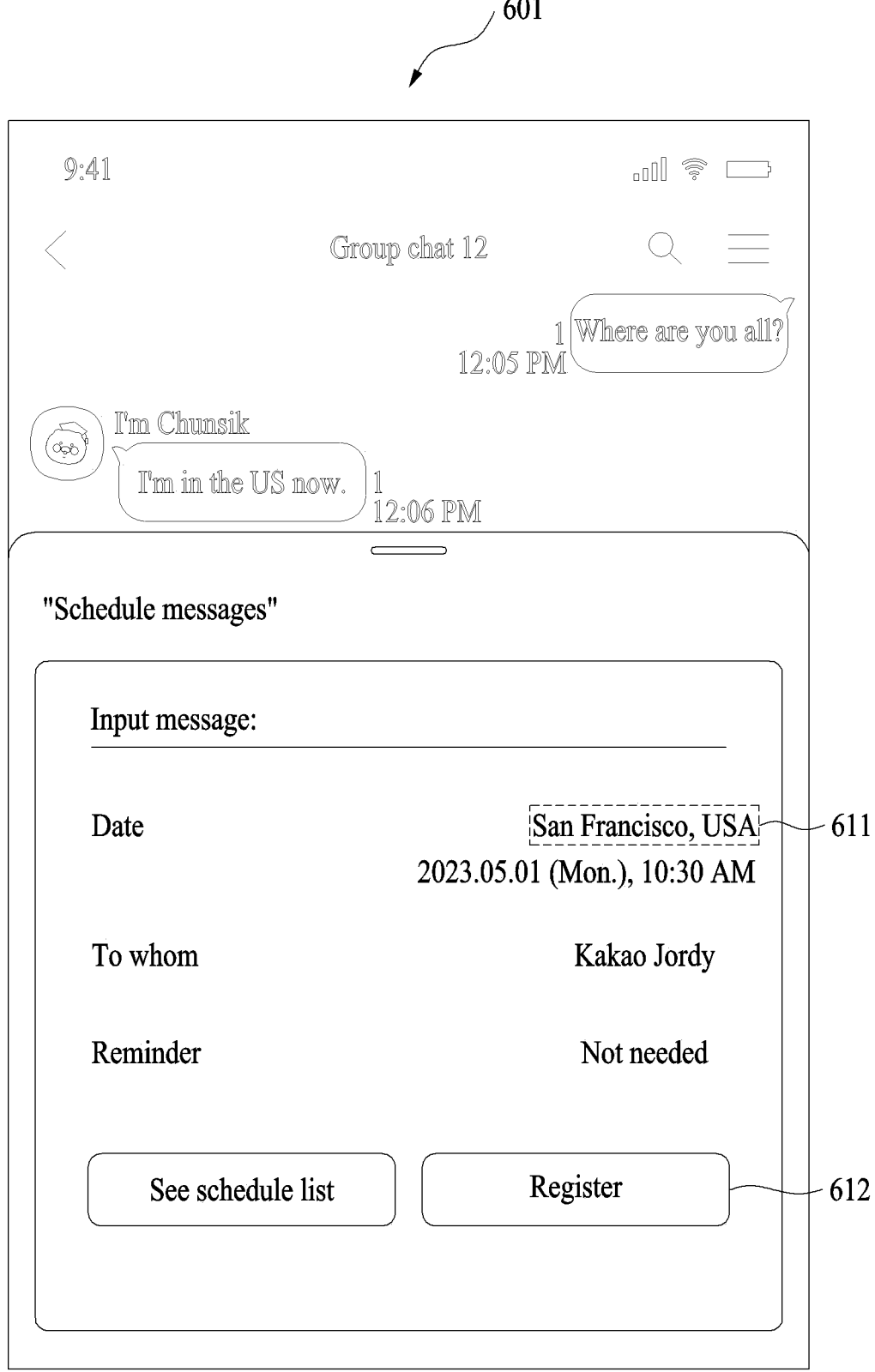
FIGS. 6A and 6B are diagrams illustrating an example interface screen for setting a scheduled message according to an embodiment.
Figure 6B:
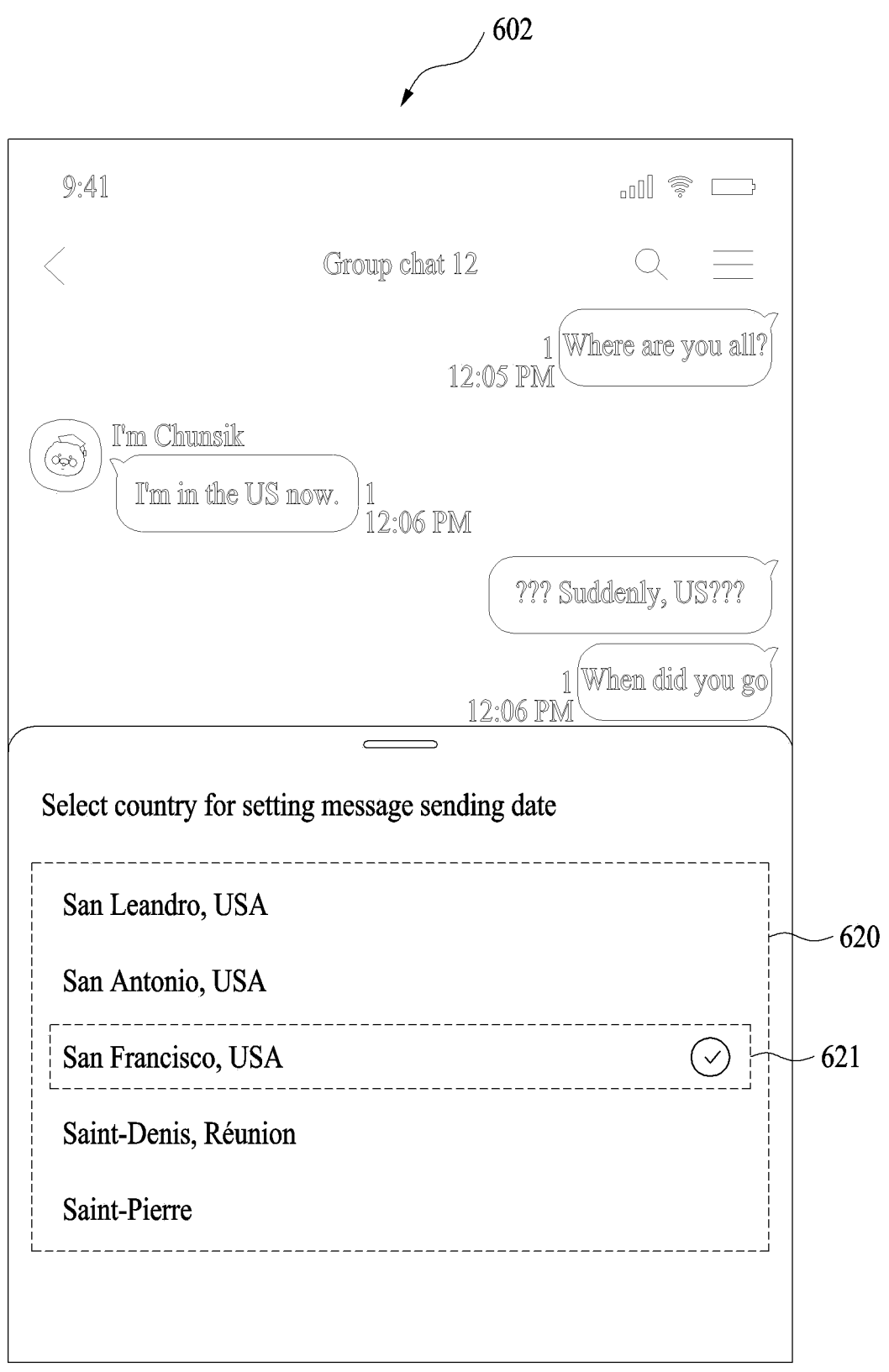

Referring to screen 602 of FIG. 6B, the interface for selecting the reference time zone of the sending time may include a time zone list 620. The time zone list 620 may include an entry(s) for a region for selecting the reference time zone of the sending time of a scheduling message. For example, in a case where an entry 621 indicated as "San Francisco, USA" is selected from the time zone list 620, a time zone of San Francisco in the USA may be determined to be the reference time zone of the sending time the scheduling message. When the time zone of San Francisco in the USA is determined to be the reference time zone, and the sending time of the scheduled message is determined to be 10:30 AM on May 1, 2023, the scheduled message may be sent at 10:30 AM on May 1, 2023, in the time of San Francisco in the USA.

Referring again to FIG. 5, according to an embodiment, operation 520 of setting the sending time of the scheduled message may include providing a time zone list including entries corresponding to regions in which participants in the chat room are located respectively, and setting the sending time of the scheduled message based on a time zone of a region corresponding to an entry selected from the time zone list.

According to an embodiment, the time zone list may include entries corresponding to regions in which the participants in the chat room are located respectively. For example, the time zone list may only include the entries corresponding to the regions in which the participants in the chat room are located, and may not include entries corresponding to regions in which the participants in the chat room are not located. For example, although the time zone list may also display the entries corresponding to the regions in which the participants in the chat room are not located, the time zone list may preferentially display the entries corresponding to the regions in which the participants in the chat room are located. That the time zone list displays preferentially a specific entry may indicate that the specific entry may be displayed at the top of the time zone list, displayed the largest on a screen where the time zone list is displayed, or displayed more visibly than other entries by being displayed at the center.

According to an embodiment, the time zone list may include entries corresponding to regions arranged based on the number of participants located in a region corresponding to each of the entries. For example, an entry corresponding to a region in which the greatest number of participants are located may be at the top of the time zone list.

According to an embodiment, entries included in the time zone list may be arranged (or sorted) according to various criteria. For example, an entry of a region in which a participant in the chat room set as a favorite account by the user account is located may be displayed preferentially on the time zone list. For example, an entry of a region in which a participant who has exchanged messages with the user account the most times is located may be displayed at the top of the time zone list.

According to an embodiment, the method of operating the terminal may include operation 530 of registering a record about the scheduled message in response to the user account.

As described above, the record about the scheduled message may include information about the content of the scheduled message, information about the sending target of the scheduled message, and information about the sending time of the scheduled message.

For example, referring to screen 601 of FIG. 6A, through an input selecting a "register" button 612 of the scheduled message setting interface, the user may register a record about an input scheduled message including information about the scheduled message in connection with the user account. For example, the terminal may transmit, to the server, information about content of an input scheduled message, information about a sending target of the scheduled message, and information about a sending time of the scheduled message, and the server may register a record about the scheduled message in connection with the user account.

According to an embodiment, based on the registered record of the scheduled message, the scheduled message may be sent. Based on the information about the content of the scheduled message, the information about the sending target of the scheduled message, and the information about the sending time of the scheduled message, which are included in the record, the scheduled message may include the information about the content and may be sent to the sending target at the sending time. For example, the scheduled message may be sent when a chat room of the sending target is valid at the sending time.

For example, in a case where there is a history of sending and receiving messages through a chat room corresponding to a sending target of a scheduled message, or a "sending target chat room" hereinafter, the chat room may be determined to be valid. In contrast, in a case where there is no history of sending and receiving messages through a sending target chat room, the chat room may be determined to be invalid.

For example, in a case where, before a scheduled message is sent, a sending target chat room is deleted, the user account leaves the sending target chat room, or other all participants except the user account leave the sending target chat room or leave the IMS, the sending target chat room may be determined to be invalid.

For example, also in a case where participant information of a sending target chat room changes as at least one user account participating in the sending target chat room leaves the sending target chat room or leaves the IMS, the sending target chat room may be determined to be invalid.

Figure 7:
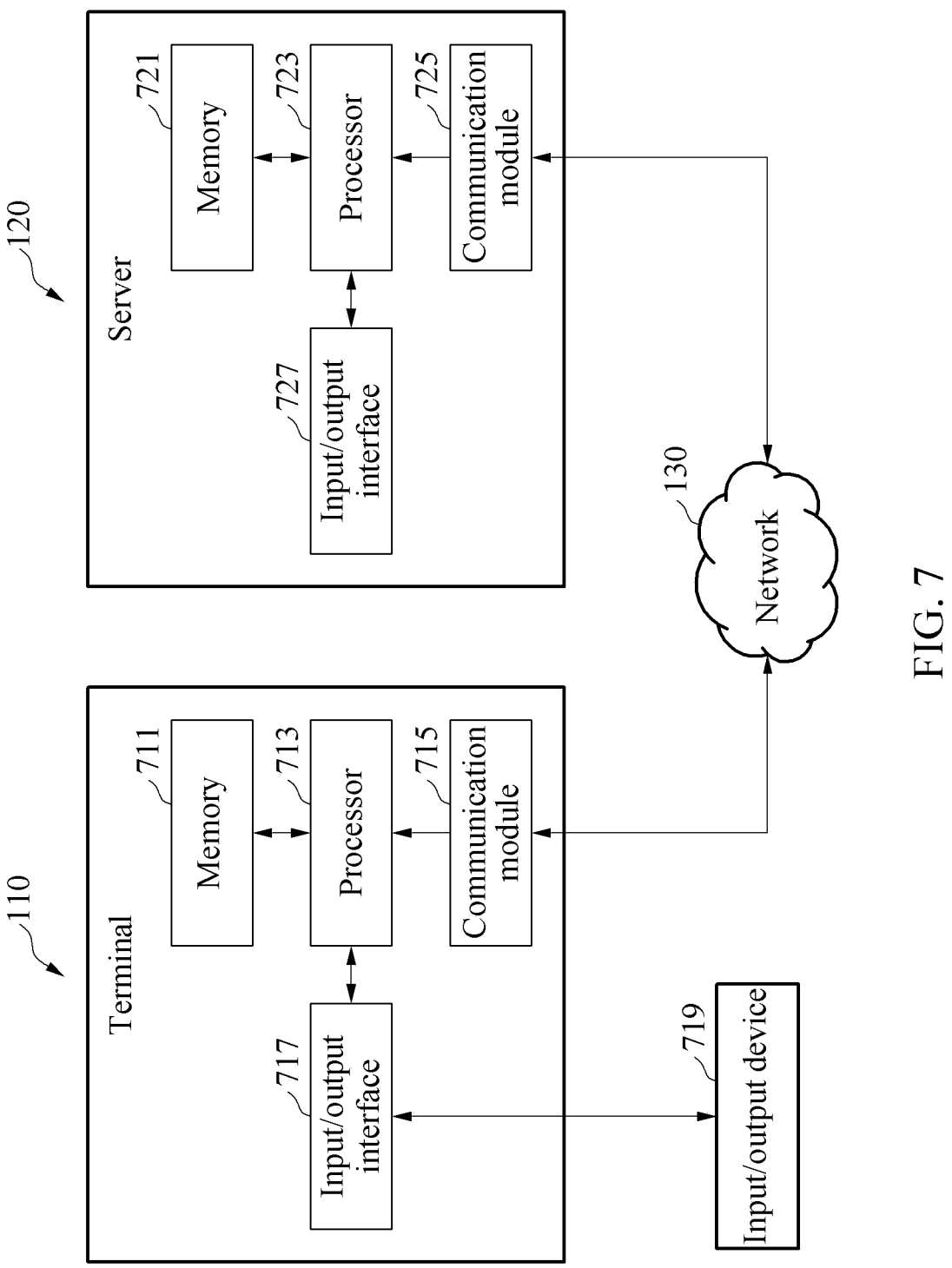
FIG. 7 is a diagram illustrating an example of a hardware configuration of a system for an IMS according to an embodiment.

FIG. 7 is a diagram illustrating an example of a hardware configuration of a system for an IMS according to an embodiment.

Referring to FIG. 7, according to an embodiment, a system (e.g., the system 100 of FIG. 1) may include a terminal 110 and a server 120 connected through a network 130.

According to an embodiment, the terminal 110 may be a mobile terminal implemented as a computer device. For example, the terminal 110 may communicate with the server 120 and/or other electronic devices through the network 130 using a wireless or wired communication method.

According to an embodiment, the server 120 may be implemented as a computer device or a plurality of computer devices that communicate with the terminal 110 and/or other servers through the network 130 to provide commands, codes, files, content, services, and the like. The communication method may include, as non-limiting examples, a communication method using a communication network (e.g., a mobile communication network, wired Internet, wireless Internet, a broadcasting network, etc.) that may be included in the network 130 and a short-range wireless communication method between devices. The network 130 may include, for example, at least one of a personal area network (PAN), a local area network (LAN), a campus area network (CAN), a metropolitan area network (MAN), a wide area network (WAN), a broadband network (BBN), and the Internet.

According to an embodiment, the server 120 may provide a file for installing an application (or app) to the terminal 110 connected through the network 130. In this case, the terminal 110 may install the application (e.g., an instant messenger) using the file provided by the server 120. In addition, the terminal 110 may connect to the server 120 under the control of an operating system (OS) and at least one program (e.g., a browser or the installed application) included in the terminal 110 and receive services or content provided by the server 120. For example, when the terminal 110 transmits a service request message to the server 120 through the network 130 under the control of the application, the server 120 may transmit a code corresponding to the service request message to the terminal 110, and the terminal 110 may then provide content to a user by configuring and displaying a screen according to the code under the control of the application.

According to an embodiment, the terminal 110 and the server 120 may each include a memory (e.g., 711 and 721), a processor (e.g., 713 and 723), a communication module (e.g., 715 and 725), and an input/output interface (e.g., 717 and 727).

According to an embodiment, the processor (713 and 723) may perform at least one of the operations described above with reference to FIGS. 1 to 6. For example, the processor 713 may perform at least one of the operations performed in the terminal 110 executing the instant messenger described above with reference to FIGS. 1 to 6, and the processor 723 may perform at least one of the operations for the IMS described above with reference to FIGS. 1 to 6. The processor (713 and 723) may be configured to process instructions of a computer program by performing basic arithmetic, logic, and input/output operations. The instructions may be provided to the processor (713 and 723) by the memory (711 and 721) or the communication module (715 and 725).

The memory (711 and 721) may be a computer-readable recording medium, which may include a volatile memory or a non-volatile memory. According to an embodiment, the memory (711 and 721) may store information for executing the instant messenger described above with reference to FIGS. 1 to 6. For example, the memory 721 may store user account information and chat room information of a user subscribed to the IMS.

According to an embodiment, the memory 711 may include a code for the instant messenger that is installed and executed (or run) on the terminal 110 using files provided by the server 120 through the network 130.

According to an embodiment, the memory 721 may store a program in which the operations for the IMS described above with reference to FIGS. 1 to 6 are implemented.

According to an embodiment, the communication module (715 and 725) may provide a function for the terminal 110 and the server 120 to communicate with each other through the network 130 and a function for them to communicate with other electronic devices or other servers.

For example, a request generated by the processor 713 of the terminal 110 according to a program code for the instant messenger stored in a recording device such as the memory 711 may be transmitted to the server 120 through the network 130 under the control of the communication module 715.

For example, control signals, commands, content, files, and the like provided under the control of the processor 723 of the server 120 may be received by the terminal 110 through the communication module 715 of the terminal 110 by passing through the communication module 1125 and the network 130.

The input/output interface (717 and 727) may be a means for interfacing with an input/output device 1119. For example, an input device may include a device such as a keyboard or a mouse, and an output device may include a device such as a display for displaying a communication session of an application. For another example, the input/ output interface 717 may be a means for interfacing with a device (e.g., a touchscreen) in which input and output functions are integrated. For example, when processing a command of a computer program loaded on the memory 711, the processor 1113 of the terminal 110 may display a service screen or content constructed using data provided by the server 120 on a display through the input/output interface 717. An input received from the user through the input/output device 719 may be provided in a form that may be processed by the processor 713 of the terminal 110 through the input/output interface 717.

According to an embodiment, the terminal 110 and the server 120 may include other components not shown in FIG. 7. For example, the terminal 110 may be implemented to include at least a portion of the input/output device 719 or may further include other components such as a transceiver, a global positioning system (GPS) module, a camera, various sensors, a database (DB), and the like.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a terminal executing an instant messenger, the method comprising:
obtaining, via an interface of the instant messenger, information about a time zone of a sending target of a scheduled message from a server for the instant messenger, based on location information determined by positioning of a participant terminal of a chat room corresponding to the sending target;
setting, via the interface of the instant messenger, a sending time of the scheduled message based on the information about the time zone of the sending target; and
requesting, via the interface of the instant messenger, registration to the server of a record about the scheduled message in connection with a user account.

2. The method of claim 1, wherein the setting of the sending time of the scheduled message comprises:
providing a time zone list comprising entries corresponding to regions in which each participant in the chat room corresponding to the sending target is located; and setting the sending time of the scheduled message based on a time zone of a region corresponding to an entry selected from the time zone list.

3. The method of claim 2, wherein the time zone list comprises:
entries corresponding to regions arranged based on a number of participants located in a region corresponding to each of the entries.

4. The method of claim 1, wherein the sending target of the scheduled message comprises at least one of:
another user account subscribed to an instant messaging service (IMS); and
a chat room created in the IMS.

5. The method of claim 1, wherein the record about the scheduled message comprises at least one of:
information about content of the scheduled message,
information about the sending target of the scheduled message, and
information about the sending time of the scheduled message.

6. The method of claim 1, wherein the scheduled message is sent to the chat room corresponding to the sending target at the sending time of the scheduled message, based on whether the chat room corresponding to the sending target of the scheduled message is determined to be valid based on whether there is a history of sending and receiving messages through the chat room.

7. The method of claim 1, further comprising:
identifying, among participants in a chat room accessed by the user account, a participant located in a time zone different from that of the user account, based on the obtained information about the time zone of the sending target;
adding, to an interface of the chat room, an indicator indicating a presence of the participant located in the time zone different from that of the user account; and
displaying, via the interface of the chat room, information about the time zone in which the participant in the chat room is located, based on the indicator.

8. The method of claim 7, wherein the displaying of the information about the time zone in which the participant in the chat room is located comprises:
displaying current time information corresponding to a location of the participant in the chat room.

9. The method of claim 7, wherein the displaying of the information about the time zone in which the participant in the chat room is located comprises:
displaying information about a region corresponding to the time zone in which the participant in the chat room is located.

10. The method of claim 9, wherein the information about the region comprises at least one of:
an identification value of the region, and
weather information of the region.

11. The method of claim 7, wherein the displaying of the information about the time zone in which the participant in the chat room is located comprises:
displaying information about participants in the chat room located in respective time zones.

12. The method of claim 7, wherein the adding of the indicator comprises:
updating the indicator, based on at least one of a change in the time zone of the user account and a change in the time zone of the participant in the chat room.

13. A non-transitory computer-readable storage medium storing instructions that, when executed by at least one processor, cause the at least one processor to perform a method of operating a terminal executing an instant messenger, the method comprising:

obtaining, via an interface of the instant messenger, information about a time zone of a sending target of a scheduled message from a server for the instant messenger, based on location information determined by positioning of a participant terminal of a chat room corresponding to the sending target;

setting, via the interface of the instant messenger, a sending time of the scheduled message based on the information about the time zone of the sending target; and requesting, via the interface of the instant messenger, registration of a record about the scheduled message in connection with a user account by the server.

14. A terminal executing an instant messenger, the terminal comprising:

at least one processor configured to:

obtain, via an interface of the instant messenger, information about a time zone of a sending target of a scheduled message from a server for the instant messenger, based on location information determined by positioning of a participant terminal of a chat room corresponding to the sending target;

set, via the interface of the instant messenger, a sending time of the scheduled message based on the information about the time zone of the sending target; and request, via the interface of the instant messenger, registration of a record about the scheduled message in connection with a user account by the server.

15. The terminal of claim 14, wherein for setting the sending time of the scheduled message the at least one processor is configured to:

provide a time zone list comprising entries corresponding to regions in which each participant in the chat room corresponding to the sending target is located; and set the sending time of the scheduled message based on a time zone of a region corresponding to an entry selected from the time zone list.

16. The terminal of claim 15, wherein the time zone list comprises:

entries corresponding to regions arranged based on the number of participants located in a region corresponding to each of the entries.

17. The terminal of claim 15, wherein the processor is further configured to:

identify, among participants in a chat room accessed by a user account, a participant located in a time zone different from that of the user account, based on the obtained information about the time zone of the sending target;

add, to an interface of the chat room accessed by the user account, an indicator indicating a presence of the participant located in the time zone different from that of the user account; and display, via the interface of the chat room, information about the time zone in which the participant in the chat room is located, based on the indicator.

18. The terminal of claim 17, wherein for displaying the information about the time zone in which the participant in the chat room is located, the at least one processor is configured to perform at least one of:

displaying current time information corresponding to a location of the participant in the chat room; and displaying information about a region corresponding to the time zone in which the participant in the chat room is located.

19. The terminal of claim 17, wherein for displaying the information about the time zone in which the participant in the chat room is located, the at least one processor is configured to:

display information about participants in the chat room located in respective time zones.

20. The terminal of claim 17, wherein for adding the indicator, the at least one processor is configured to:

update the indicator based on at least one of a change in the time zone of the user account and a change in the time zone of the participant in the chat room.

*   *   *   *   *